(12) United States Patent
Zhang

(10) Patent No.: US 8,905,619 B2
(45) Date of Patent: Dec. 9, 2014

(54) BACKLIGHT MODULE AND DISPLAY PANEL

(71) Applicant: Yanxue Zhang, Guangdong (CN)

(72) Inventor: Yanxue Zhang, Guangdong (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 222 days.

(21) Appl. No.: 13/703,413

(22) PCT Filed: Sep. 26, 2012

(86) PCT No.: PCT/CN2012/081982
§ 371 (c)(1),
(2), (4) Date: Dec. 11, 2012

(87) PCT Pub. No.: WO2014/040312
PCT Pub. Date: Mar. 20, 2014

(65) Prior Publication Data
US 2014/0140101 A1 May 22, 2014

(30) Foreign Application Priority Data
Sep. 13, 2012 (CN) .......................... 2012 1 0338423

(51) Int. Cl.
F21V 7/04 (2006.01)
F21V 15/01 (2006.01)
G02F 1/1333 (2006.01)

(52) U.S. Cl.
CPC .......... *F21V 15/01* (2013.01); *G02F 1/133308* (2013.01); *G02F 2001/133317* (2013.01); *G02F 2001/133322* (2013.01)
USPC .............................. 362/633; 362/632; 349/58

(58) Field of Classification Search
CPC ........................... F21V 15/01; G02F 1/133308
USPC ...................................... 349/58; 362/632–634
See application file for complete search history.

(56) References Cited

U.S. PATENT DOCUMENTS

| | | | |
|---|---|---|---|
| 2008/0100769 A1* | 5/2008 | Hsiao et al. | 349/58 |
| 2008/0158473 A1* | 7/2008 | Liang | 349/58 |
| 2010/0309102 A1* | 12/2010 | Jung | 362/97.1 |

* cited by examiner

*Primary Examiner* — Stephen F Husar
(74) *Attorney, Agent, or Firm* — Kirton McConkie; Evan R. Witt

(57) ABSTRACT

The present invention discloses a backlight module and display device. The backlight module includes a front bezel and a frame. The frame includes a first connecting member and a second connecting member located on two opposite sides of a frame body of the frame. Each of the first connecting member and the second connecting member has a trench on the inner side. The front bezel includes a first side frame and a second side frame located oppositely. The first side frame and the second side frame are correspondingly plugged into the trenches of the first connecting member and the second connecting member. The front bezel is fixed to the frame through a third side frame.

16 Claims, 2 Drawing Sheets

BACKLIGHT MODULE AND DISPLAY PANEL

BACKGROUND OF THE INVENTION

1. Field of the Invention

The invention relates to LCD, and more particularly, to a backlight module and display panel.

2. Description of the Prior Art

As the population of the display devices, the demands for the functions of the components in the display device are more restricted.

Please refer to FIG. 1, which is a diagram showing a cross-section view of a convention edge-lit light emitting diode (LED) backlight module. The LED backlight module comprises a front bezel 11 and a frame 12.

Please refer to FIG. 2, which is a diagram showing the front bezel 11 shown in FIG. 1. In order to fix the front bezel 11 and the frame 12, conventionally, the shape of each side frame 111 of the front bezel 11 is designed as the reversed "L" shape. In this way, each side frame 111 can be fixed with the frame 12 through screws (not shown).

Unfortunately, the above-mentioned fixing mechanism has some problems. First of all, the side frame 111 of the front bezel 11 need to be manufactured through a pressing process to form the reversed "L" shapes. This manufacturing process is complicated and costs much because it needs a lot of metals. Furthermore, the side frames 111 needs to be fixed by humans. This also raises the costs. In addition, the curved front bezel 11 occupies the space of the backlight module, and this is not good for a narrow-side-frame design.

Therefore, a solution is needed to solve the above-mentioned problem.

SUMMARY OF THE INVENTION

It is therefore one of the primary objectives of the claimed invention to provide a fixed procedure to manufacture the front bezel and the frame such that the costs can be reduced, the efficiency of the manufacturing procedure can be raised, and the narrow-side-frame design can be achieved.

According to an exemplary embodiment of the claimed invention, a backlight module is disclosed. The backlight module comprises a frame and a front bezel. The frame comprises a frame main body, having a supporting surface for placing a panel; a first connecting member; and a second connecting member; wherein the first connecting member and the second connecting member are located on two opposite sides of the frame main body to form protrusions higher than the supporting surface of the frame body and have trenches on inner sides of the first connecting member and the second connecting member. The front bezel has a hole in the middle. The front bezel comprises: a first side frame; a second side frame, wherein the first side frame and the second side frame are located oppositely, and are correspondingly plugged inside the trenches of the first connecting member and the second connecting member; and a third side frame, located between the first side frame and the second side frame, the third side frame has a protruded fixing member higher than a surface of the front bezel, and the front bezel and the frame are fixed by the protruded fixing member.

In one aspect of the present invention, the front bezel further comprises a fourth side frame located oppositely to the third side frame, the frame correspondingly has a third connecting member having a trench on an inner side of the third connecting member, and the fourth side frame is plugged inside the trench of the third connecting member.

In another aspect of the present invention, the first side frame, the second side frame, and the fourth side frame are flat plates.

In another aspect of the present invention, the fixing member comprises fixing holes, and the frames further comprises corresponding screw holes such that the front bezel and the frame are fixed through utilizing screws to plug into the fixing holes and the screw holes.

According to another embodiment of the present invention, a backlight module comprises a frame and a front bezel. The frame comprises a frame main body, having a supporting surface for placing a panel; a first connecting member; and a second connecting member; wherein the first connecting member and the second connecting member are located on two opposite sides of the frame main body to form protrusions higher than the supporting surface of the frame body and have trenches on inner sides of the first connecting member and the second connecting member. The front bezel has a hole in the middle. The front bezel comprises: a first side frame; a second side frame, wherein the first side frame and the second side frame are located oppositely, and are correspondingly plugged inside the trenches of the first connecting member and the second connecting member; and a third side frame, located between the first side frame and the second side frame, for fixing the front bezel and the frame.

In one aspect of the present invention, the third side frame has a protruded fixing member higher than a surface of the front bezel, and the front bezel and the frame are fixed by the protruded fixing member.

In another aspect of the present invention, the front bezel further comprises a fourth side frame located oppositely to the third side frame, the frame correspondingly has a third connecting member having a trench on an inner side of the third connecting member, and the fourth side frame is plugged inside the trench of the third connecting member.

In another aspect of the present invention, the first side frame, the second side frame, and the fourth side frame are flat plates.

In another aspect of the present invention, the fixing member comprises fixing holes, and the frames further comprises corresponding screw holes such that the front bezel and the frame are fixed through utilizing screws to plug into the fixing holes and the screw holes.

In another aspect of the present invention, the trenches of the first connecting member, the second connecting member, and the third connecting member are manufactured with a sinking mechanism.

According to another embodiment of the present invention, a display device is provided. The display device comprises a backlight module. The backlight module comprises: a frame, comprising: a frame main body, having a supporting surface for placing a panel; a first connecting member; and a second connecting member; wherein the first connecting member and the second connecting member are located on two opposite sides of the frame main body to form protrusions higher than the supporting surface of the frame body and have trenches on inner sides of the first connecting member and the second connecting member. The back light module further comprises a front bezel, having a hole in the middle, the front bezel comprising: a first side frame; a second side frame, wherein the first side frame and the second side frame are located oppositely, and are correspondingly plugged inside the trenches of the first connecting member and the second connecting member; and a third side frame, located between the first side frame and the second side frame, for fixing the front bezel and the frame.

In one aspect of the present invention, the third side frame has a protruded fixing member higher than a surface of the front bezel, and the front bezel and the frame are fixed by the protruded fixing member.

In another aspect of the present invention, the front bezel further comprises a fourth side frame located oppositely to the third side frame, the frame correspondingly has a third connecting member having a trench on an inner side of the third connecting member, and the fourth side frame is plugged inside the trench of the third connecting member.

In another aspect of the present invention, the first side frame, the second side frame, and the fourth side frame are flat plates.

In another aspect of the present invention, the fixing member comprises fixing holes, and the frames further comprises corresponding screw holes such that the front bezel and the frame are fixed through utilizing screws to plug into the fixing holes and the screw holes.

In another aspect of the present invention, the trenches of the first connecting member, the second connecting member, and the third connecting member are manufactured with a sinking mechanism.

The present invention frame comprises opposite first connecting member and the second connecting member. The first connecting member and the second connecting member have trenches on the inner side. Furthermore, the first side frame and the second side frame oppositely placed on the front bezel are plugged into the trenches of the first connecting member and the second connecting member correspondingly. In addition, the third side frame is used to fix the front bezel and the frame. Obviously, the present invention has a simple fixing mechanism, raises the efficiency of the fixing procedure, and makes it easy to achieve the narrow-side-frame design.

These and other objectives of the claimed invention will no doubt become obvious to those of ordinary skill in the art after reading the following detailed description of the preferred embodiment that is illustrated in the various figures and drawings.

DETAILED DESCRIPTION OF THE PREFERRED EMBODIMENT

Figure 1:
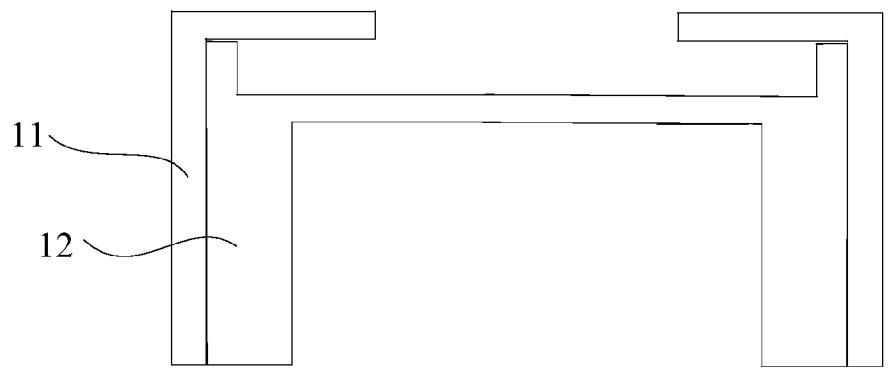
FIG. 1 is a diagram showing a cross-section view of a convention edge-lit light emitting diode (LED) backlight module.
Figure 2:
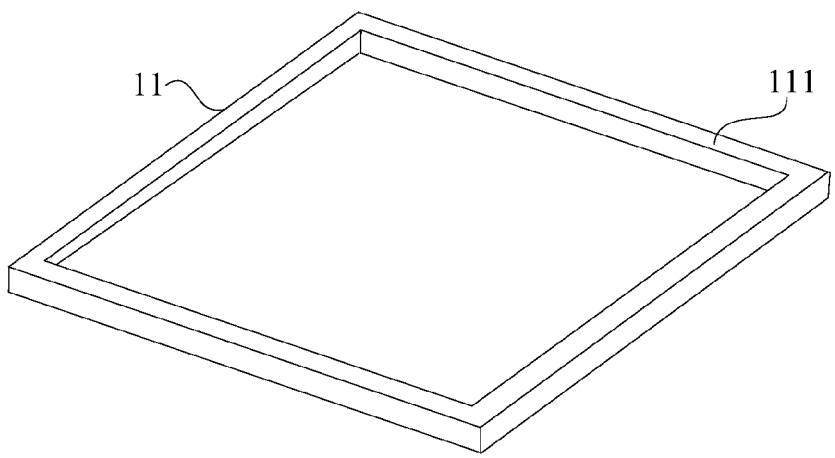
FIG. 2 is a diagram showing the front bezel shown in FIG. 1.
Figure 3:
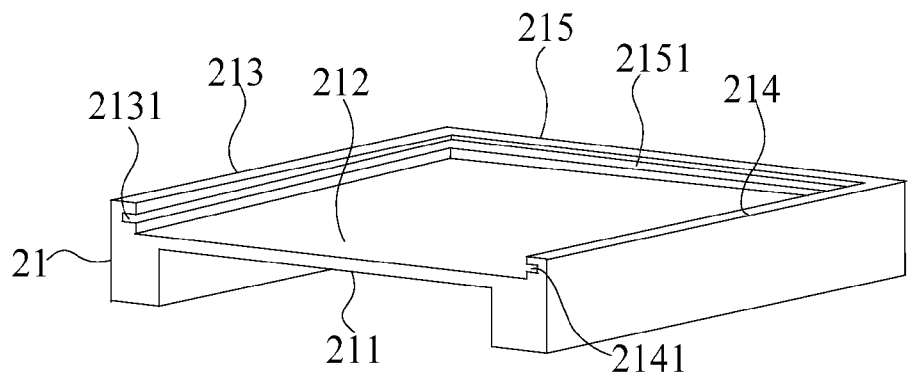
FIG. 3 is a diagram showing a backlight according to a preferred embodiment of the present invention.

Please refer to FIG. 3, which is a diagram showing a frame of a backlight module according to a preferred embodiment of the present invention.

The frame 21 comprises a frame body 211. The frame body 211 comprises a supporting surface 212 for placing the panel. The frame 21 further comprises a first connecting member 213, a second connecting member 214, and a third connecting member 215. The first connecting member 213, the second connecting member 214, and the third connecting member 215 are protruded from the supporting surface 212 of the frame body 211. The first connecting member 213 and the second connecting member 214 are located on two opposite sides of the frame body 211. The third connecting member 215 is located between the first connecting member 213 and the second connecting member 214.

In this embodiment, the first connecting member 213 has a first trench 2131 on the inner side, where the opening of the trench 2131 is toward the supporting surface 212. The second connecting member 214 has a second trench 2141 on the inner side, where the opening of the trench 2141 is toward the supporting surface 212. The third connecting member 215 has a third trench 2151 on the inner side, where the opening of the trench 2151 is toward the supporting surface 212.

The first trench 2131, the second trench 2141, and the third trench 2151 can be manufactured with a sinking mechanism. Surely, they can be manufactured with other methods. For example, the inner side of the connecting members can form two bulges parallel to each other such that the space between the two bulges can form the above-mentioned trenches.

Figure 4:
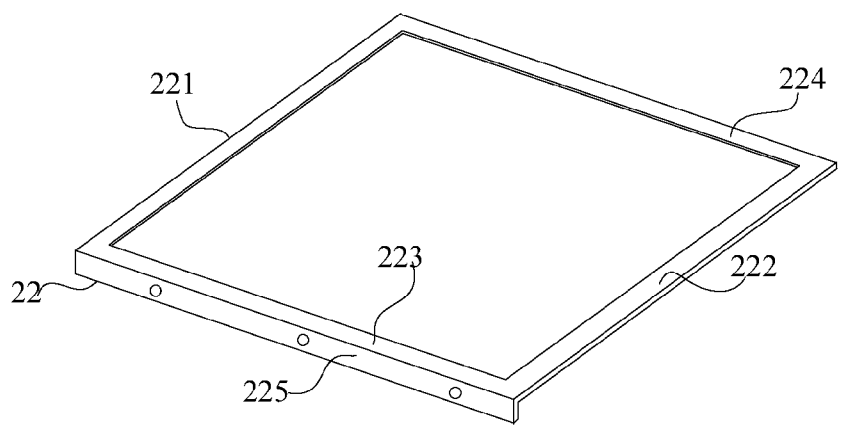
FIG. 4 is a diagram showing a front bezel according to a preferred embodiment of the present invention.

Please refer to FIG. 4, which is a diagram showing a front bezel 22 according to a preferred embodiment of the present invention.

The front bezel 22 has a hole in the middle. The front bezel 22 comprises a first side frame 221, a second side frame 222, a third side frame 223, and a fourth side frame 224. The first side frame 221 and the second side frame 222 are located oppositely. The third side frame 223 and the fourth side frame 224 are located oppositely. The first side frame 221, the second side frame 222, and the fourth side frame 224 are all flat plates.

Please note, the first side frame 221, the second side frame 222, and the fourth side frame 224 can be other shapes as long as they can be connected to the corresponding trenches in order to fix the front bezel 22 and the frame. This means that the above-mentioned flat plate shape is only regarded as an embodiment, not a limitation of the present invention.

Figure 5:
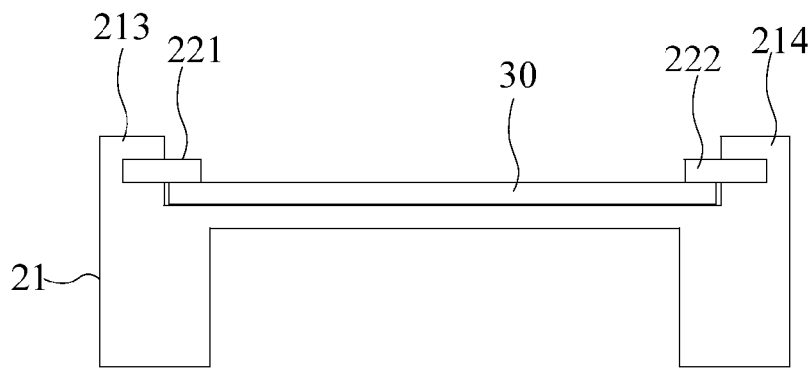
FIG. 5 is a diagram showing a cross-view of the front bezel and the frame when the front bezel and the frame are assembled with each other.

Please refer to FIG. 5, which is a diagram showing a cross-view of the front bezel 22 and the frame 21 when the front bezel 22 and the frame 21 are assembled with each other.

When the front bezel 22 are assembled to the frame 21, the first side frame 221 and the second side frame 222 are respectively plugged into the first trench 2131 of the first connecting member 213 and the second trench 2141 of the second connecting member 214. And then, the front bezel 22 are pushed to slide along the first trench 2131 and the second trench 2141 until the fourth side frame 224 are plugged into the third trench 2151 of the third connecting member 215.

After that, the front bezel 22 is fixed to the frame 21 through the third side frame 223 such that the panel 30 is fixed between the front bezel 22 and the frame 21.

In FIG. 4, the third side frame 223 has a protruded fixing member 224, which is protruded from the surface of the front bezel 22. The fixing member 225 comprises one or more fixing holes (not shown), and the frame 21 correspondingly comprises screw holes (not shown) in corresponding locations. In this way, screws can be used to pass through the fixing holes and the screw holes in order to fix the front bezel 22 and the frame 21. The panel 30 is fixed between the front bezel and the frame 21 accordingly. Please note, the above-mentioned fixing mechanism is only an embodiment, not a limitation of the present invention. Other fixing mechanisms can also be used as long as the front 22 can be fixed with the frame. For example, soldering can also be used, and this and other fixing mechanisms all obey the spirit of the present invention.

The present invention further provides a display device, which comprises the above-mentioned backlight module comprising the above-mentioned front bezel 22 and frame 21.

The frame 21 comprises a frame body 211. The frame body 211 comprises a supporting surface 212 for placing the panel. The frame 21 further comprises a first connecting member 213 and a second connecting member 214.

The first connecting member 213 and the second connecting member 214 are located on two opposite sides of the frame body 211. The first connecting member 213 has a first trench 2131 on the inner side, where the opening of the trench 2131 is toward the supporting surface 212. The second connecting member 214 has a second trench 2141 on the inner side, where the opening of the trench 2141 is toward the supporting surface 212.

The front bezel 22 has a hole in the middle. The front bezel 22 comprises a first side frame 221 and a second side frame 222. The side frame 221 and the second side frame 222 are respectively plugged into the first trench 2131 and the second trench 2141. The front bezel 22 further comprises a third side frame 223, which is located between the first side frame 221 and the second side frame. The front bezel 22 is fixed to the frame 21 through the third side frame 223.

Please note, the detailed description of the backlight module of the display device has been illustrated in the above disclosure, and thus omitted here.

In contrast to the related art, the present invention frame comprises opposite first connecting member and the second connecting member. The first connecting member and the second connecting member have trenches on the inner side. Furthermore, the first side frame and the second side frame oppositely placed on the front bezel are plugged into the trenches of the first connecting member and the second connecting member correspondingly. In addition, the third side frame is used to fix the front bezel and the frame. Obviously, the present invention has a simple fixing mechanism, raises the efficiency of the fixing procedure, and makes it easy to achieve the narrow-side-frame design.

Those skilled in the art will readily observe that numerous modifications and alterations of the device may be made while retaining the teachings of the invention. Accordingly, the above disclosure should be construed as limited only by the metes and bounds of the appended claims.

What is claimed is :

1. A backlight module comprising:
a frame, comprising:
a frame main body, having a supporting surface for placing a panel;
a first connecting member; and
a second connecting member; wherein the first connecting member and the second connecting member are located on two opposite sides of the frame main body to form protrusions higher than the supporting surface of the frame body and have trenches on inner sides of the first connecting member and the second connecting member; and
a front bezel, having a hole in the middle, the front bezel comprising:
a first side frame;
a second side frame, wherein the first side frame and the second side frame are located oppositely, and are correspondingly plugged inside the trenches of the first connecting member and the second connecting member; and
a third side frame, located between the first side frame and the second side frame, the third side frame has a protruded fixing member higher than a surface of the front bezel, and the front bezel and the frame are fixed by the protruded fixing member.

2. The backlight module of claim 1, wherein the front bezel further comprises a fourth side frame located oppositely to the third side frame, the frame correspondingly has a third connecting member having a trench on an inner side of the third connecting member, and the fourth side frame is plugged inside the trench of the third connecting member.

3. The backlight module of claim 2, wherein the first side frame, the second side frame, and the fourth side frame are flat plates.

4. The backlight module of claim 1, wherein the fixing member comprises fixing holes, and the frames further comprises corresponding screw holes such that the front bezel and the frame are fixed through utilizing screws to plug into the fixing holes and the screw holes.

5. A backlight module comprising:
a frame, comprising:
a frame main body, having a supporting surface for placing a panel;
a first connecting member; and
a second connecting member; wherein the first connecting member and the second connecting member are located on two opposite sides of the frame main body to form protrusions higher than the supporting surface of the frame body and have trenches on inner sides of the first connecting member and the second connecting member; and
a front bezel, having a hole in the middle, the front bezel comprising:
a first side frame;
a second side frame, wherein the first side frame and the second side frame are located oppositely, and are correspondingly plugged inside the trenches of the first connecting member and the second connecting member; and
a third side frame, located between the first side frame and the second side frame, for fixing the front bezel and the frame.

6. The backlight module of claim 5, wherein the third side frame has a protruded fixing member higher than a surface of the front bezel, and the front bezel and the frame are fixed by the protruded fixing member.

7. The backlight module of claim 6, wherein the front bezel further comprises a fourth side frame located oppositely to the third side frame, the frame correspondingly has a third connecting member having a trench on an inner side of the third connecting member, and the fourth side frame is plugged inside the trench of the third connecting member.

8. The backlight module of claim 7, wherein the first side frame, the second side frame, and the fourth side frame are flat plates.

9. The backlight module of claim 6, wherein the fixing member comprises fixing holes, and the frames further comprises corresponding screw holes such that the front bezel and the frame are fixed through utilizing screws to plug into the fixing holes and the screw holes.

10. The backlight module of claim 7, wherein the trenches of the first connecting member, the second connecting member, and the third connecting member are manufactured with a sinking mechanism.

11. A display panel comprising a backlight module, the backlight module comprising:
a frame, comprising:
a frame main body, having a supporting surface for placing a panel;
a first connecting member; and a second connecting member; wherein the first connecting member and the second connecting member are located on two opposite sides of the frame main body to form protrusions higher than the supporting surface of the frame body and have trenches on inner sides of the first connecting member and the second connecting member; and a front bezel, having a hole in the middle, the front bezel comprising:
  a first side frame;
  a second side frame, wherein the first side frame and the second side frame are located oppositely, and are correspondingly plugged inside the trenches of the first connecting member and the second connecting member; and
  a third side frame, located between the first side frame and the second side frame, for fixing the front bezel and the frame.

12. The display panel of claim 11, wherein the third side frame has a protruded fixing member higher than a surface of the front bezel, and the front bezel and the frame are fixed by the protruded fixing member.

13. The display panel of claim 12, wherein the front bezel further comprises a fourth side frame located oppositely to the third side frame, the frame correspondingly has a third connecting member having a trench on an inner side of the third connecting member, and the fourth side frame is plugged inside the trench of the third connecting member.

14. The display panel of claim 13, wherein the first side frame, the second side frame, and the fourth side frame are flat plates.

15. The display panel of claim 12, wherein the fixing member comprises fixing holes, and the frames further comprises corresponding screw holes such that the front bezel and the frame are fixed through utilizing screws to plug into the fixing holes and the screw holes.

16. The display panel of claim 13, wherein the trenches of the first connecting member, the second connecting member, and the third connecting member are manufactured with a sinking mechanism.

* * * * *